United States Patent
Peng et al.

(10) Patent No.: US 9,774,188 B2
(45) Date of Patent: Sep. 26, 2017

(54) METHOD FOR OBTAINING SYMMETRIC POWER TRANSFER COEFFICIENTS UNDER SIMULTANEOUS CHANGE OF SOURCES AND LOADS IN AC POWER NETWORKS

(71) Applicant: SHENZHEN UNIVERSITY, Shenzhen (CN)

(72) Inventors: Jianchun Peng, Shenzhen (CN); Hui Jiang, Shenzhen (CN)

(73) Assignee: SHENZHEN UNIVERSITY, Shenzhen, Guangdong (CN)

( * ) Notice: Subject to any disclaimer, the term of this patent is extended or adjusted under 35 U.S.C. 154(b) by 251 days.

(21) Appl. No.: 14/772,610

(22) PCT Filed: Nov. 18, 2014

(86) PCT No.: PCT/CN2014/091409
§ 371 (c)(1),
(2) Date: Sep. 3, 2015

(87) PCT Pub. No.: WO2016/077994
PCT Pub. Date: May 26, 2015

(65) Prior Publication Data
US 2016/0301209 A1    Oct. 13, 2016

(51) Int. Cl.
*H02J 1/10*    (2006.01)
*H02J 3/46*    (2006.01)
(Continued)

(52) U.S. Cl.
CPC ............ *H02J 3/12* (2013.01); *H02J 3/006* (2013.01); *H02J 2003/007* (2013.01);
(Continued)

(58) Field of Classification Search
CPC ........ H02J 3/12; H02J 3/006; H02J 2003/007; Y02E 60/76; Y04S 10/525; Y04S 40/22
(Continued)

(56) References Cited

U.S. PATENT DOCUMENTS

| | | | |
|---|---|---|---|
| 2003/0139887 A1 | 7/2003 | Fulczyk | |
| 2013/0134779 A1* | 5/2013 | Watanabe | G05F 1/70 307/24 |

FOREIGN PATENT DOCUMENTS

| | | |
|---|---|---|
| CN | 102510107 | 6/2012 |
| CN | 102709908 | 10/2012 |

(Continued)

OTHER PUBLICATIONS

International Search Report and Written Opinion from PCT/CN2014/091409, dated May 29, 2015 (12 pages total).

*Primary Examiner* — Carlos Amaya
(74) *Attorney, Agent, or Firm* — Hamre, Schumann, Mueller & Larson, P.C.

(57) ABSTRACT

The present invention belongs to electric power engineering field, relates to a method for obtaining a set of symmetric power transfer coefficients under simultaneous change of sources and loads in AC power networks, which comprises the steps of: firstly establishing a linear function of a lossy branch transferred power in terms of buses voltage angles according to a nonlinear function of a branch transferred power, parameters and operation features of the AC power network; then establishing symmetric linear functions of buses injection powers of power sources and loads in terms of buses voltage angles by combining the linear function of the lossy branch transferred power in terms of buses voltage angles and buses injection powers of power sources and loads, in turn establishing symmetric linear functions of buses voltage angles in terms of buses injection powers of power sources and loads; and finally obtaining the symmetric power transfer coefficients from buses injection powers of power sources and loads to the lossy branch transferred power under simultaneous change of sources and loads by using the linear functions just mentioned above. The obtained set of symmetric power transfer coefficients is (Continued)

unique, follows electric circuit laws, is applicable for the practical situations that power sources and loads change at the same time and transmission losses need considering in the AC power network, and truly reflects the substantive characteristics of the power transfer from bus injection powers to branch transferred powers.

5 Claims, 2 Drawing Sheets

(51) Int. Cl.
  *H02J 3/12* (2006.01)
  *H02J 3/00* (2006.01)
(52) U.S. Cl.
  CPC .............. *Y02E 60/76* (2013.01); *Y04S 10/525* (2013.01); *Y04S 40/22* (2013.01)
(58) Field of Classification Search
  USPC .......................................................... 307/24
  See application file for complete search history.

(56) References Cited

FOREIGN PATENT DOCUMENTS

| | | |
|---|---|---|
| CN | 103595043 | 2/2014 |
| CN | 103956733 | 7/2014 |

\* cited by examiner

US 9,774,188 B2

METHOD FOR OBTAINING SYMMETRIC POWER TRANSFER COEFFICIENTS UNDER SIMULTANEOUS CHANGE OF SOURCES AND LOADS IN AC POWER NETWORKS

TECHNICAL FIELD

The present invention belongs to electric power engineering field, and in particular, relates to a method for obtaining a set of symmetric power transfer coefficients in an alternating current (AC) power network under simultaneous change of sources and loads.

BACKGROUND

At present, in AC power network, a power transfer coefficient from a bus injection power to a branch transferred power is not only needed to be used in the normal state regulation of real-time operation to ensure the real-time economy, but also is needed to be used in the failure state control to satisfy the real-time requirement of power network security and stability. Therefore, the power transfer coefficient from the bus injection power to the branch transferred power is an important tool that allows the operation of AC power network more secure, stable and economical.

The existing methods for obtaining a set of power transfer coefficients in AC power network are based on the set of buses power balancing equations neglecting transmission losses and discarding reference-bus power balancing equation (the reference-bus is an artificially specified bus at which bus voltage angle is set to zero). By the existing methods, a set of power transfer coefficients from the bus injection power of each bus to the branch transferred power of each branch in AC power network varies with the change of the artificially specified reference-bus, is not unique (that is it doesn't comply with the uniqueness theorem for electromagnetic field in circuits), and the power transfer coefficients from the reference-bus injection power of power sources and loads to the branch transferred powers of individual branches are constantly zero (that is the power sources and loads connected to reference-bus don't follow electric circuit laws). In addition, the existing methods for obtaining a set of power transfer coefficients from buses injection powers to branch transferred power in AC power network are implemented either by assuming that the bus injection power of each load is invariant, or by assuming that the bus injection power of each power source is invariant, which are not applicable to the practical situation that the bus injection powers of power sources and loads change at the same time. For the existing methods for obtaining a set of power transfer coefficients in AC power network, the obtained results thereof not only don't comply with the uniqueness theorem for electromagnetic field in circuits, but also don't follow electric circuit laws, are not applicable to the practical situation that the power network is lossy and bus injection powers of power sources and loads change at the same time, and thus fail to truly reflect the substantive characteristics of the power transfer from bus injection powers to branch transferred powers.

SUMMARY

The present invention aims at providing a method for obtaining symmetric power transfer coefficients under simultaneous change of sources and loads in AC power network, to solve the problem that the obtained results of the existing methods for obtaining a set of power transfer coefficients in AC power network not only don't comply with the uniqueness theorem for electromagnetic field in circuits, but also don't follow electric circuit laws, are not applicable to the practical situation that the power network is lossy and bus injection powers of power sources and loads change at the same time, and thus fail to truly reflect the substantive characteristics of the power transfer from bus injection powers to branch transferred powers.

The present invention is implemented by a method for obtaining a set of symmetric power transfer coefficients under simultaneous change of sources and loads in AC power network, which comprises:

establishing a linear function of a lossy branch transferred power in terms of buses voltage angles according to given AC power network parameters, a nonlinear function of a branch transferred power in the AC power network, and operation features of the AC power network;

establishing symmetric linear functions of buses injection powers of power sources and loads in terms of buses voltage angles according to the linear function of the lossy branch transferred power in terms of buses voltage angles and given buses injection powers of power sources and loads;

establishing symmetric linear functions of buses voltage angles in terms of buses injection powers of power sources and loads according to the symmetric linear functions of buses injection powers of power sources and loads in terms of buses voltage angles;

obtaining the symmetric power transfer coefficients from buses injection powers of power sources and loads to the lossy branch transferred power under simultaneous change of sources and loads according to the symmetric linear functions of buses voltage angles in terms of buses injection powers of power sources and loads and the linear function of the lossy branch transferred power in terms of buses voltage angles.

In the present invention, the method comprises the steps of: firstly establishing a linear function of a lossy branch transferred power in terms of buses voltage angles according to a nonlinear function of a branch transferred power, parameters and operation features of the AC power network; then establishing symmetric linear functions of buses injection powers of power sources and loads in terms of buses voltage angles by combining the linear function of the lossy branch transferred power in terms of buses voltage angles and buses injection powers of power sources and loads, in turn establishing symmetric linear functions of buses voltage angles in terms of buses injection powers of power sources and loads; and finally obtaining the symmetric power transfer coefficients from buses injection powers of power sources and loads to the lossy branch transferred power under simultaneous change of sources and loads by using the linear functions just mentioned above. The obtained set of symmetric power transfer coefficients is unique, follows electric circuit laws, is applicable for the practical situations that power sources and loads change at the same time and transmission losses need considering in the AC power network, and truly reflects the substantive characteristics of the power transfer from bus injection powers to branch transferred powers, thus solve the problem that the obtained results of the existing methods for obtaining a set of power transfer coefficients in AC power network not only don't comply with the uniqueness theorem for electromagnetic field in circuits, but also don't follow electric circuit laws, are not applicable to the practical situation that the power network is lossy and bus injection powers of power sources and loads change at the same time, and thus fail to truly reflect the substantive characteristics of the power transfer from bus injection powers to branch transferred powers.

DESCRIPTION OF EMBODIMENTS

Figure 1:
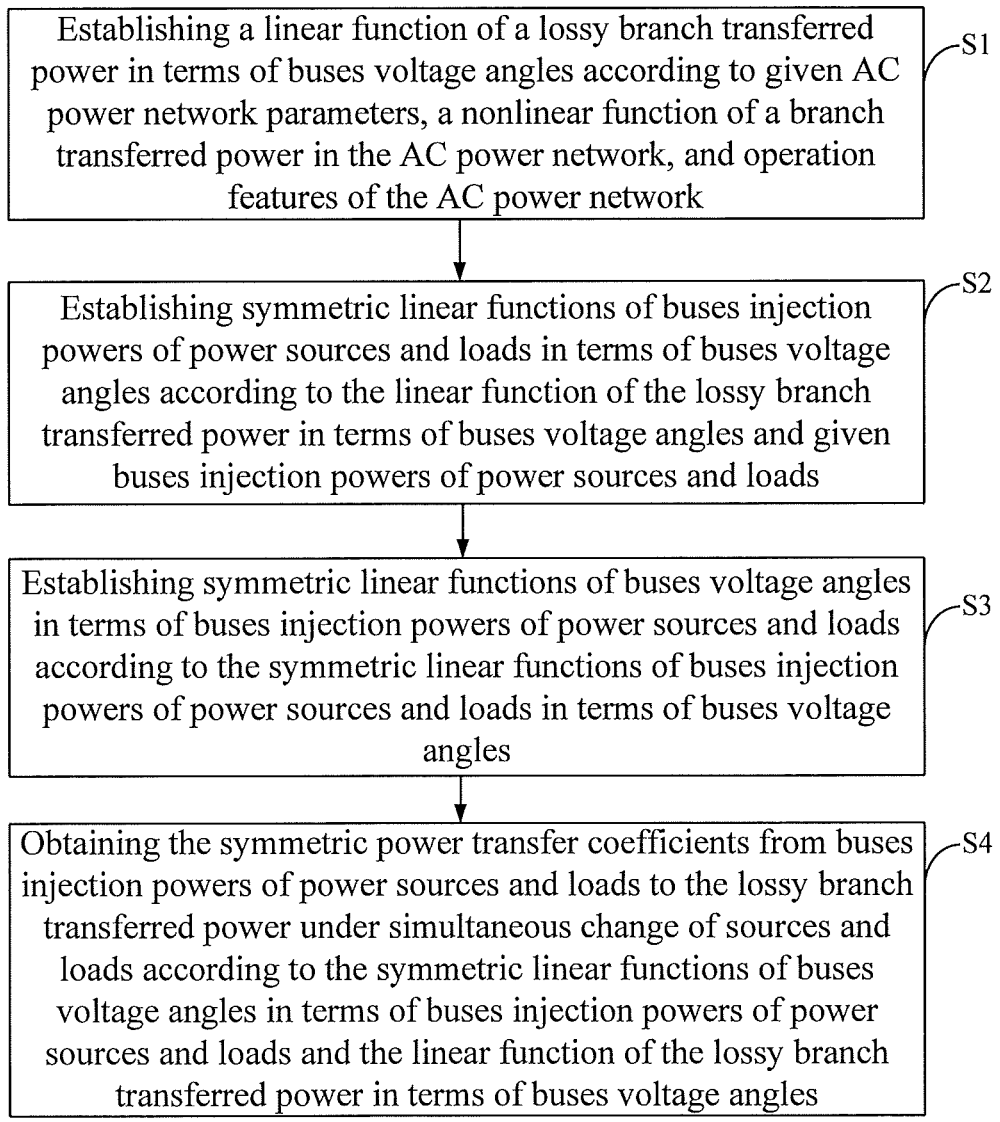
FIG. 1 is a flow chart of a method for obtaining a set of symmetric power transfer coefficients under simultaneous change of sources and loads in AC power network according to an embodiment of the present invention.

To make the objectives, technical solutions, and advantages of the present invention clearer and more comprehensible, the following further describes the present invention in detail with reference to the accompanying drawings and embodiments. It should be understood that the specific embodiment described herein is merely used to explain the present invention but is not used to limit the present invention to it.

An embodiment of the present invention provides a method for obtaining symmetric power transfer coefficients under simultaneous change of sources and loads in alternating current (AC) power network, which comprises:

establishing a linear function of a lossy branch transferred power in terms of buses voltage angles according to given AC power network parameters, a nonlinear function of a branch transferred power in the AC power network, and operation features of the AC power network;

establishing symmetric linear functions of buses injection powers of power sources and loads in terms of buses voltage angles according to the linear function of the lossy branch transferred power in terms of buses voltage angles and given buses injection powers of power sources and loads;

establishing symmetric linear functions of buses voltage angles in terms of buses injection powers of power sources and loads according to the symmetric linear functions of buses injection powers of power sources and loads in terms of buses voltage angles;

obtaining the symmetric power transfer coefficients from buses injection powers of power sources and loads to the lossy branch transferred power under simultaneous change of sources and loads according to the symmetric linear functions of buses voltage angles in terms of buses injection powers of power sources and loads and the linear function of the lossy branch transferred power in terms of buses voltage angles.

In the embodiment of the present invention, the method comprises the steps of: firstly establishing a linear function of a lossy branch transferred power in terms of buses voltage angles according to a nonlinear function of a branch transferred power, parameters and operation features of the AC power network; then establishing symmetric linear functions of buses injection powers of power sources and loads in terms of buses voltage angles by combining the linear function of the lossy branch transferred power in terms of buses voltage angles and buses injection powers of power sources and loads, in turn establishing symmetric linear functions of buses voltage angles in terns of buses injection powers of power sources and loads; and finally obtaining the symmetric power transfer coefficients from buses injection powers of power sources and loads to the lossy branch transferred power under simultaneous change of sources and loads by using the linear functions just mentioned above.

The obtained set of symmetric power transfer coefficients is unique, follows electric circuit laws, is applicable for the practical situations that power sources and loads change at the same time and transmission losses need considering in the AC power network, and truly reflects the substantive characteristics of the power transfer from bus injection powers to branch transferred powers, thus solve the problem that the obtained results of the existing methods for obtaining a set of power transfer coefficients in AC power network not only don't comply with the uniqueness theorem for electromagnetic field in circuits, but also don't follow electric circuit laws, are not applicable to the practical situation that the power network is lossy and bus injection powers of power sources and loads change at the same time, and thus fail to truly reflect the substantive characteristics of the power transfer from bus injection powers to branch transferred powers.

FIG. 1 shows the flow chart of the method for obtaining a set of symmetric power transfer coefficients under simultaneous change of sources and loads in AC power network according to an embodiment of the present invention. For illustration purposes, only the parts related to the embodiment of the present invention are shown, which are described in detail as follow:

In step S1, a linear function of a lossy branch transferred power in terms of buses voltage angles is established according to given AC power network parameters, a nonlinear function of a branch transferred power in the AC power network, and operation features of the AC power network.

The step S1 comprises:

according to the given AC power network parameters, the nonlinear function of the branch transferred power in the AC power network(i.e. the branch transferred power equals the bus voltage times complex conjugation of the branch current, which is the common AC power network knowledge), and operation features of the AC power network (i.e. the bus voltage angle difference across any branch in the AC power network is always quite small), establishing a linear function of the lossy branch transferred power in twins of buses voltage angles by the following equation:

$$P_{ij} = -b_{ij}(\theta_i - \theta_j)$$

Figure 2:
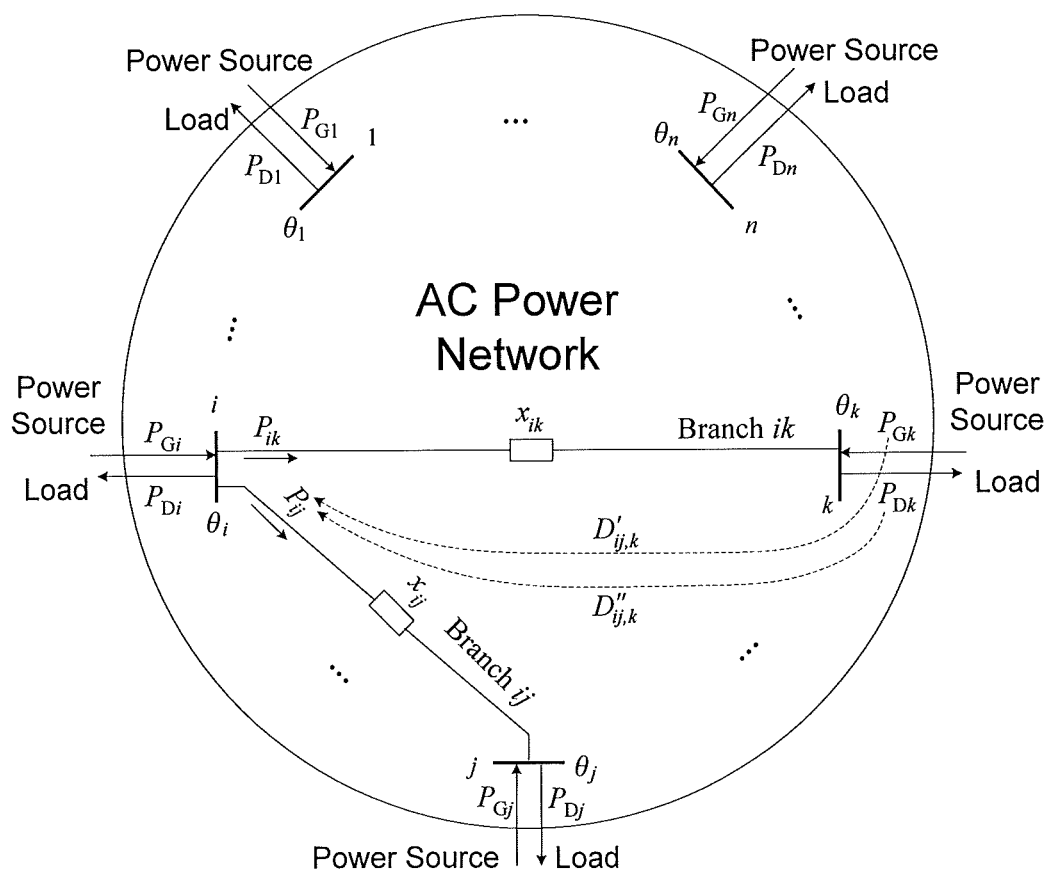
FIG. 2 is a structure diagram of a universal model in AC power network according to an embodiment of the present invention.

As shown in FIG. 2, i and j are the numbers of two arbitrary buses in the AC power network respectively, i and j are natural numbers and equal to 1, 2 ..., n, n is the total number of buses in the AC power network (the buses herein refer to those operating independently in the AC power network), n is natural number and is the given AC power network parameter; ij is the branch between bus i and bus j; $P_{ij}$ is the lossy branch transferred power entering branch ij from bus i; $\theta_i$ and $\theta_j$ are voltage angles at bus i and bus j respectively; $b_{ij}$ is a constant determined by the formula of $$b_{ij} = -\frac{0.5 r_{ij}(\theta'_i - \theta'_j) + x_{ij}}{r_{ij}^2 + x_{ij}^2},$$

its property is similar to a branch susceptance, and $b_{ij}$ is called-pseudo branch susceptance of branch ij, where the $r_{ij}$ and $x_{ij}$ are the resistance and reactance of branch ij respectively and are the given AC power network parameters; $\theta'_i$ and $\theta'_j$ are the initial buses voltage angles at bus i and bus j respectively and are the given AC power network parameters.

The lossy branch transferred power mentioned above refers to the loss-retained branch transferred power, the above function of the branch transferred power $P_{ij}$ contains inapparently the branch resistance $r_{ij}$ by the pseudo branch susceptance $b_{ij}$, and the implied branch resistance reflects the transmission losses, therefore $P_{ij}$ is called lossy branch transferred power (i.e. the loss-retained branch transferred power).

In step S2, symmetric linear functions of buses injection powers of power sources and loads in terms of buses voltage angles are established according to the linear function of the lossy branch transferred power in terms of buses voltage angles and given buses injection powers of power sources and loads.

The step S2 comprises:

according to the linear function of the lossy branch transferred power in terms of buses voltage angles and the given buses injection powers of power sources and loads, establishing the linear function of particular bus injection power of power sources and loads in terms of buses voltage angles by the following equation:

$$P_{Gi} - P_{Di} = -\sum_{k=1, k \neq i}^{n} b_{ik}(\theta_i - \theta_k)$$

As shown in FIG. 2, $P_{Gi}$ and $-P_{Di}$ are the bus injection powers of power sources and loads connected to bus i respectively; k is the number of each bus in the AC power network; k is natural number and k is equal to 1,2, . . . , n; $\theta_k$ is the bus voltage angle at bus k; ik is the branch between bus i and bus k; $b_{ik}$ is the pseudo branch susceptance of branch ik determined by the formula of $$b_{ik} = -\frac{0.5 r_{ik}(\theta'_i - \theta'_k) + x_{ik}}{r_{ik}^2 + x_{ik}^2},$$

where the $r_{ik}$ and $x_{ik}$ are the resistance and reactance of branch ik respectively and are the given AC power network parameters; $\theta'_k$ is the initial bus voltage angle at bus k and is the given AC power network parameter; and according to the linear function of particular bus injection powers of power sources and loads in terms of buses voltage angles, establishing the symmetric linear functions of buses injection powers of power sources and loads in terms of buses voltage angles by the following matrix equation:

$$\begin{bmatrix} P_{G1} - P_{D1} \\ \vdots \\ P_{Gi} - P_{Di} \\ \vdots \\ P_{Gn} - P_{Dn} \end{bmatrix} = (c_{ij}) \begin{bmatrix} \theta_1 \\ \vdots \\ \theta_i \\ \vdots \\ \theta_n \end{bmatrix}, c_{ij} = \begin{cases} b_{ij}, & \text{for } j \neq i \\ -\sum_{k=1, k \neq i}^{n} b_{ik}, & \text{for } j = i \end{cases}$$

As shown in FIG. 2, where $P_{G1}$ and $-P_{D1}$ are the bus injection powers of power sources and loads connected to bus 1 respectively (the bus injection power of the power source refers to the time-average power of the power source entering bus 1, the bus injection power of the load refers to the minus of time-average power of the load absorbing from bus 1); where $P_{Gn}$ and $-P_{Dn}$ are the bus injection powers of power sources and loads connected to bus n respectively (the bus injection power of the power source refers to the time-average power of the power source entering bus n, the bus injection power of the load refers to the minus of time-average power of the load absorbing from bus n); $\theta_1$ and $\theta_n$ are the bus voltage angles at bus 1 and bus n respectively; $(c_{ij})$ is the AC power network complete bus susceptance matrix built by pseudo branch susceptances, its property is similar to the actual bus susceptance matrix and $(c_{ij})$ is thus called pseudo bus susceptance matrix, $c_{ij}$ is row i and column j element of the pseudo bus susceptance matrix $(c_{ij})$.

In the above matrix-equation-described linear functions of buses injection powers of power sources and loads in terms of buses voltage angles, the forms of the functions of buses injection powers of power sources and loads at all buses are identical, that is each bus is treated equally, so the linear functions are called symmetric linear functions.

In step S3, symmetric linear functions of buses voltage angles in terms of buses injection powers of power sources and loads are established according to the symmetric linear functions of buses injection powers of power sources and loads in terms of buses voltage angles.

The step S3 comprises:

according to the symmetric linear functions of buses injection powers of power sources and loads in terms of buses voltage angles, establishing symmetric linear functions of buses voltage angles in terms of buses injection powers of power sources and loads by the following matrix equation:

$$\begin{bmatrix} \theta_1 \\ \vdots \\ \theta_i \\ \vdots \\ \theta_n \end{bmatrix} = (a_{ij}) \begin{bmatrix} P_{G1} - P_{D1} \\ \vdots \\ P_{Gi} - P_{Di} \\ \vdots \\ P_{Gn} - P_{Dn} \end{bmatrix}, (a_{ij}) = (c_{ij})^+$$

where $(a_{ij})$ is the generalized pseudo bus reactance matrix of the AC power network and equals to Moore-Penrose pseudoinverse of pseudo bus susceptance matrix $(c_{ij})$ of the AC power network, "+" is the operator of the Moore-Penrose pseudoinverse in the algebra.

In the above matrix-equation-described linear functions of buses voltage angles in terms of buses injection powers of power sources and loads, the forms of the functions of buses voltage angles at all buses are identical, that is each bus is treated equally, so the linear functions are called symmetric linear functions.

In step S4, the symmetric power transfer coefficients from buses injection powers of power sources and loads to the lossy branch transferred power under simultaneous change of sources and loads are obtained according to the symmetric linear functions of buses voltage angles in terms of buses injection powers of power sources and loads and the linear function of the lossy branch transferred power in terms of buses voltage angles.

The step S4 comprises:

according to the symmetric linear functions of buses voltage angles in terms of buses injection powers of power sources and loads and the linear function of the lossy branch transferred power in terms of buses voltage angles, establishing the symmetric linear function of the lossy branch transferred power in terms of buses injection powers of power sources and loads by the following equation:

$$P_{ij} = -b_{ij} \sum_{k=1}^{n} (a_{ik} - a_{jk})(P_{Gk} - P_{Dk})$$

where $a_{ik}$ is row i and column k element of the generalized pseudo bus reactance matrix $(a_{ij})$ of the AC power network; $a_{jk}$ is row j and column k element of the generalized pseudo bus reactance matrix $(a_{ij})$ of the AC power network;

according to the symmetric linear function of the lossy branch transferred power in terms of buses injection powers of power sources and loads, obtaining the symmetric power transfer coefficients from the buses injection powers of power sources and loads to the lossy branch transferred power under simultaneous change of sources and loads by the following equations:

$$D'_{ij,k} = -b_{ij}(a_{ik}-a_{jk})$$

$$D''_{ij,k} = b_{ij}(a_{ik}-a_{jk})$$

where $D'_{ij,k}$ is the symmetric power transfer coefficient from the bus injection power of the power sources connected to bus k to the lossy branch transferred power of branch ij; $D''_{ij,k}$ is the symmetric power transfer coefficient from the bus absorbing power of the loads connected to bus k to the lossy branch transferred power of branch ij.

$D'_{ij,k}$ and $D''_{ij,k}$ are obtained according to the symmetric linear function of the lossy branch transferred power (i.e. the loss-retained branch transferred power) in terms of buses injection powers of power sources and loads, and the symmetric linear function not only considers simultaneous change of sources and loads, but also is identical for all branches, so $D'_{ij,k}$ and $D''_{ij,k}$ are called the symmetric power transfer coefficients under simultaneous change of sources and loads.

Using the above sequence of functions-calculates the symmetric power transfer coefficients for each couple of buses and branches then the symmetric power transfer coefficients from all buses injection powers of power sources and loads to each lossy branch transferred power under simultaneous change of sources and loads are obtained. The symmetric power transfer coefficients not only comply with the uniqueness theorem for electromagnetic field in circuits, but also follow electric circuit laws, are applicable to the practical situation that the power network is lossy and bus injection powers of power sources and loads change at the same time, and thus can truly reflect the substantive characteristics of the power transfer from bus injection powers to branch transferred powers.

In the embodiment of the present invention, the method comprises the steps of: firstly establishing a linear function of a lossy branch transferred power in terms of buses voltage angles according to a nonlinear function of a branch transferred power, parameters and operation features of the AC power network; then establishing symmetric linear functions of buses injection powers of power sources and loads in terms of buses voltage angles by combining the linear function of the lossy branch transferred power in terms of buses voltage angles and buses injection powers of power sources and loads, in turn establishing symmetric linear functions of buses voltage angles in terms of buses injection powers of power sources and loads; and finally obtaining the symmetric power transfer coefficients from buses injection powers of power sources and loads to the lossy branch transferred power under simultaneous change of sources and loads by using the linear functions just mentioned above. The obtained set of symmetric power transfer coefficients is unique, follows electric circuit laws, is applicable for the practical situations that power sources and loads change at the same time and transmission losses need considering in the AC power network, and truly reflects the substantive characteristics of the power transfer from bus injection powers to branch transferred powers, thus solve the problem that the obtained results of the existing methods for obtaining a set of power transfer coefficients in AC power network not only don't comply with the uniqueness theorem for electromagnetic field in circuits, but also don't follow electric circuit laws, are not applicable to the practical situation that the power network is lossy and bus injection powers of power sources and loads change at the same time, and thus fail to truly reflect the substantive characteristics of the power transfer from bus injection powers to branch transferred powers.

The foregoing descriptions are merely exemplary embodiment of the present invention, but are not intended to limit the present invention to it. Any modification, equivalent replacement, or improvement made without departing from the spirit and principle of the present invention shall fall within the protection scope of the present invention.

What is claimed is:

1. A method for obtaining a set of symmetric power transfer coefficients under simultaneous change of sources and loads in alternating current (AC) power networks, which comprises:

establishing a linear function of a lossy branch transferred power in terms of buses voltage angles according to given AC power network parameters, a nonlinear function of a branch transferred power in the AC power network, and operation features of the AC power network;

establishing symmetric linear functions of buses injection powers of power sources and loads in terms of buses voltage angles according to the linear function of the lossy branch transferred power in terms of buses voltage angles and given buses injection powers of power sources and loads;

establishing symmetric linear functions of buses voltage angles in terms of buses injection powers of power sources and loads according to the symmetric linear functions of buses injection powers of power sources and loads in terms of buses voltage angles;

obtaining the symmetric power transfer coefficients from buses injection powers of power sources and loads to the lossy branch transferred power under simultaneous change of sources and loads according to the symmetric linear functions of buses voltage angles in terms of buses injection powers of power sources and loads and the linear function of the lossy branch transferred power in terms of buses voltage angles.

2. The method for obtaining a set of symmetric power transfer coefficients under simultaneous change of sources and loads in AC power networks according to claim 1, wherein the step of establishing a linear function of the lossy branch transferred power in terms of buses voltage angles according to the given AC power network parameters, the nonlinear function of the branch transferred power in the AC power network, and operation features of the AC power network comprises the step of:

according to the given AC power network parameters, the nonlinear function of the branch transferred power in the AC power network, and the operation features of the AC power network, establishing a linear function of the lossy branch transferred power in terms of buses voltage angles by the following equation:

$$P_{ij} = -b_{ij}(\theta_i - \theta_j)$$

where i and j are the numbers of two arbitrary buses in the AC power network respectively, i and j are natural numbers and equal to 1, 2 ..., n, n is the total number of buses in the AC power network, n is natural number and is the given AC power network parameter; ij is the branch between bus i and bus j; $P_{ij}$ is the lossy branch transferred power entering branch ij from bus i; $\theta_i$ and $\theta_j$ are voltage angles at bus i and bus j respectively; $b_{ij}$ is a constant determined by the formula of $$b_{ij} = -\frac{0.5 r_{ij}(\theta'_i - \theta'_j) + x_{ij}}{r_{ij}^2 + x_{ij}^2}$$

and is a pseudo branch susceptance of branch ij, where $r_{ij}$ and $x_{ij}$ are the resistance and reactance of branch ij respectively and are the given AC power network parameters; $\theta'_i$ and $\theta'_j$ are the initial buses voltage angles at bus i and bus j respectively and are the given AC power network parameters.

3. The method for obtaining a set of symmetric power transfer coefficients under simultaneous change of sources and loads in AC power networks according to claim 2, wherein the step of establishing symmetric linear functions of buses injection powers of power sources and loads in terms of buses voltage angles according to the linear function of the lossy branch transferred power in terms of buses voltage angles and the given bus injection powers of power sources and loads comprises the steps of:

according to the linear function of the lossy branch transferred power in terms of buses voltage angles and the given bus injection powers of power sources and loads, establishing the linear function of particular bus injection power of power sources and loads in terms of buses voltage angles by the following equation:

$$P_{Gi} - P_{Di} = -\sum_{k=1, k \neq i}^{n} b_{ik}(\theta_i - \theta_k)$$

where $P_{Gi}$ and $-P_{Di}$ are the bus injection powers of power sources and loads connected to bus i respectively; k is the number of each bus in the AC power network; k is natural number and k is equal to 1,2 . . . , n; $\theta_k$ is the bus voltage angle at bus k; ik is the branch between bus i and bus k; $b_{ik}$ is the pseudo branch susceptance of branch ik determined by the formula of $$b_{ik} = -\frac{0.5 r_{ik}(\theta'_i - \theta'_k) + x_{ik}}{r_{ik}^2 + x_{ik}^2},$$

where $r_{ik}$ and $x_{ik}$ are the resistance and reactance of branch ik respectively and are the given AC power network parameters; $\theta'_k$ is the initial bus voltage angle at bus k and is the given AC power network parameter; and according to the linear function of particular bus injection powers of power sources and loads in terms of buses voltage angles, establishing the symmetric linear functions of buses injection powers of power sources and loads in terms of buses voltage angles by the following matrix equation:

$$\begin{bmatrix} P_{G1} - P_{D1} \\ \vdots \\ P_{Gi} - P_{Di} \\ \vdots \\ P_{Gn} - P_{Dn} \end{bmatrix} = (c_{ij}) \begin{bmatrix} \theta_1 \\ \vdots \\ \theta_i \\ \vdots \\ \theta_n \end{bmatrix}, c_{ij} = \begin{cases} b_{ij}, & \text{for } j \neq i \\ -\sum_{k=1, k \neq i}^{n} b_{ik}, & \text{for } j = i \end{cases}$$

where $P_{G1}$ and $-P_{D1}$ are the bus injection powers of power sources and loads connected to bus 1 respectively; where $P_{Gn}$ and $-P_{Dn}$ are the bus injection powers of power sources and loads connected to bus n respectively; $\theta_1$ and $\theta_n$ are the bus voltage angles at bus 1 and bus n respectively; $(c_{ij})$ is a pseudo bus susceptance matrix, $c_{ij}$ is row i and column j element of the pseudo bus susceptance matrix $(c_{ij})$.

4. The method for obtaining a set of symmetric power transfer coefficients in AC power network under simultaneous change of sources and loads according to claim 3, wherein the step of establishing symmetric linear functions of buses voltage angles in terms of buses injection powers of power sources and loads according to the symmetric linear functions of buses injection powers of power sources and loads in terms of buses voltage angles comprises the step of:

according to the symmetric linear functions of buses injection powers of power sources and loads in terms of buses voltage angles, establishing symmetric linear functions of buses voltage angles in terms of buses injection powers of power sources and loads by the following matrix equation:

$$\begin{bmatrix} \theta_1 \\ \vdots \\ \theta_i \\ \vdots \\ \theta_n \end{bmatrix} = (a_{ij}) \begin{bmatrix} P_{G1} - P_{D1} \\ \vdots \\ P_{Gi} - P_{Di} \\ \vdots \\ P_{Gn} - P_{Dn} \end{bmatrix}, (a_{ij}) = (c_{ij})^{+}$$

where $(a_{ij})$ is the generalized pseudo bus reactance matrix of the AC power network and equals to Moore-Penrose pseudoinverse of pseudo bus susceptance matrix $(c_{ij})$ of the AC power network, "+" is the operator of the Moore-Penrose pseudoinverse in the algebra.

5. The method for obtaining a set of symmetric power transfer coefficients under simultaneous change of sources and loads in AC power networks according to claim 4, wherein the step of obtaining the symmetric power transfer coefficients from the buses injection powers of power sources and loads to the lossy branch transferred power under simultaneous change of sources and loads according to the symmetric linear functions of buses voltage angles in terms of buses injection powers of power sources and loads and the linear function of the lossy branch transferred power in terms of buses voltage angles comprises the steps of:

according to the symmetric linear functions of buses voltage angles in terms of buses injection powers of power sources and loads and the linear function of the lossy branch transferred power in terms of buses voltage angles, establishing the symmetric linear function of the lossy branch transferred power in terms of buses injection powers of power sources and loads by the following equation:

$$P_{ij} = -b_{ij} \sum_{k=1}^{n} (a_{ik} - a_{jk})(P_{Gk} - P_{Dk})$$

where $a_{ik}$ is row i and column k element of the generalized pseudo bus reactance matrix ($a_{ij}$) of the AC power network; $a_{jk}$ is row j and column k element of the generalized pseudo bus reactance matrix ($a_{ij}$) of the AC power network;

according to the symmetric linear function of the lossy branch transferred power in terms of buses injection powers of power sources and loads, obtaining the symmetric power transfer coefficients from the buses injection powers of power sources and loads to the lossy branch transferred power under simultaneous change of sources and loads by the following equations:

$$D'_{ij,k} = -b_{ij}(a_{ik} - a_{jk})$$

$$D''_{ij,k} = b_{ij}(a_{ik} - a_{jk})$$

where $D'_{ij,k}$ is the symmetric power transfer coefficient from the bus injection power of the power sources connected to bus k to the lossy branch transferred power of branch ij; $D''_{ij,k}$ is the symmetric power transfer coefficient from the bus absorbing power of the load connected to bus k to the lossy branch transferred power of branch ij.

* * * * *